May 12, 1925.

E. D. SCHMIDT

TOASTER

Filed March 14, 1924

INVENTOR.
E. D. Schmidt,
BY
Geo. P. Kimmel.
ATTORNEY.

May 12, 1925.  
E. D. SCHMIDT  
TOASTER  
Filed March 14, 1924

INVENTOR.  
E. D. Schmidt,  
Geo. F. Kimmel  
ATTORNEY.

Patented May 12, 1925.

1,537,499

UNITED STATES PATENT OFFICE.

EDWARD D. SCHMIDT, OF MEDFORD, OKLAHOMA.

TOASTER.

Application filed March 14, 1924. Serial No. 699,246.

*To all whom it may concern:*

Be it known that I, EDWARD D. SCHMIDT, a citizen of the United States, residing at Medford, in the county of Grant and State of Oklahoma, have invented certain new and useful Improvements in Toasters, of which the following is a specification.

This invention relates to toasters and has for its primary object the provision of a toaster whereby the bread may be held, turned and delivered to a plate without the necessity of touching it with the fingers.

Another object is the provision of a toaster which will present the entire surface of the slice of bread to the flames, thus producing a slice of toast browned over its entire surface and not divided into toasted and untoasted areas.

Still another object is the provision of a toaster having therewith a flame and heat diffusing element, allowing the toaster to be placed over a naked flame without danger of burning the bread.

A still further object is the provision of a toaster which will be light in weight, yet strong and durable, and inexpensive to manufacture.

The invention will be best understood from a consideration of the following detailed description taken in connection with the accompanying drawings forming part of this specification, with the understanding that the invention is not confined to any strict conformity with the showing of the drawings, but may be changed and modified so long as such changes and modifications mark no material departure from the salient features of the invention as expressed in the appended claims.

In the drawings:—

Figure 1:
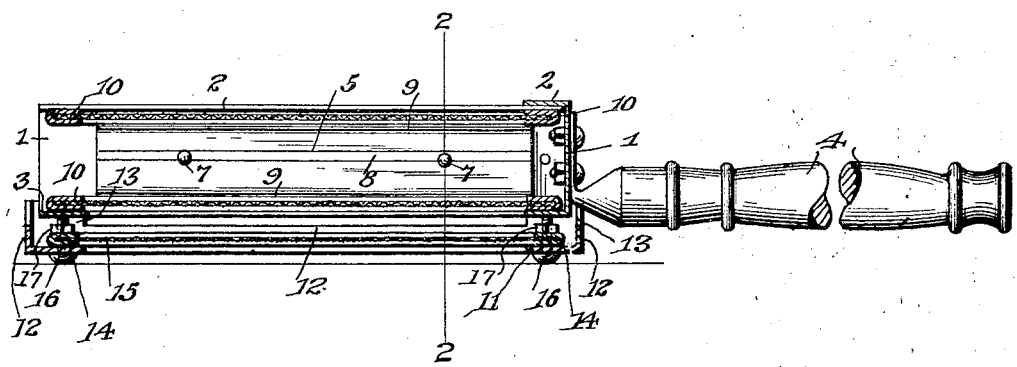
Fig. 1 is a vertical longitudinal sectional view of the toaster and supporting stand complete.
Figure 2:
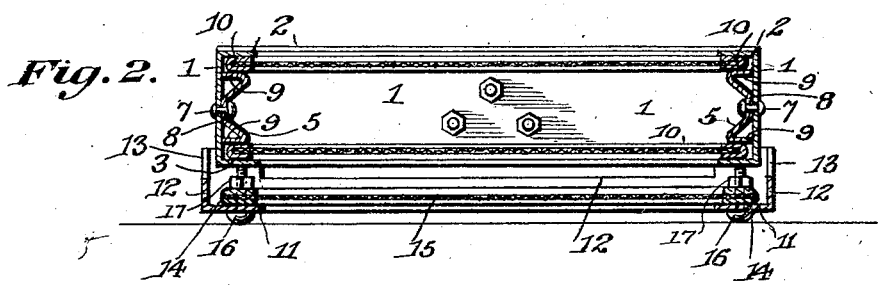
Fig. 2 is a vertical transverse view taken on the line 2—2 of Fig. 1.
Figure 3:
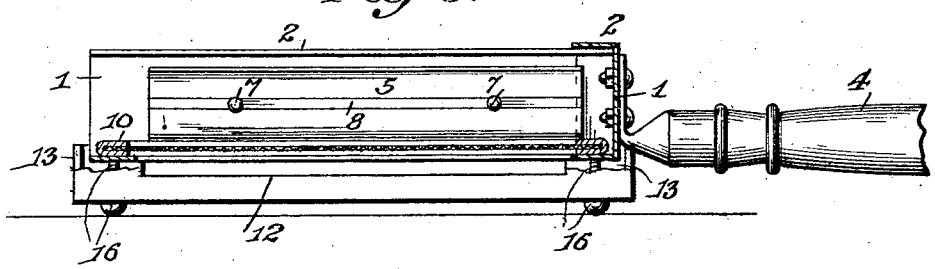
Fig. 3 is a view similar to Fig. 1 with the exception that the top screen has been removed.
Figure 7:
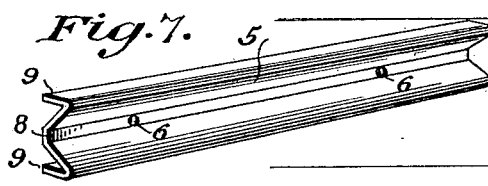
Fig. 7 is a detail perspective view of a screen guide and retaining member.
Figure 4:
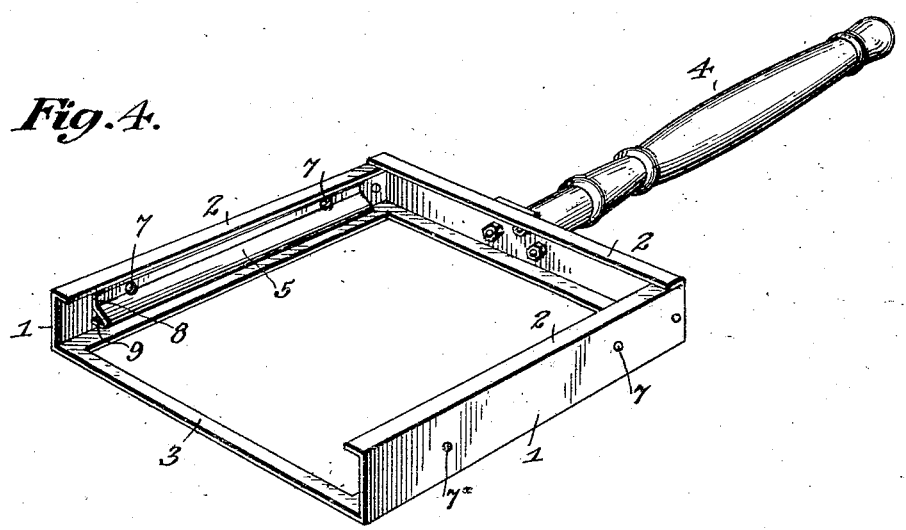
Fig. 4 is a perspective view of the toaster frame removed from the base and with the upper and lower screen removed.
Figure 5:
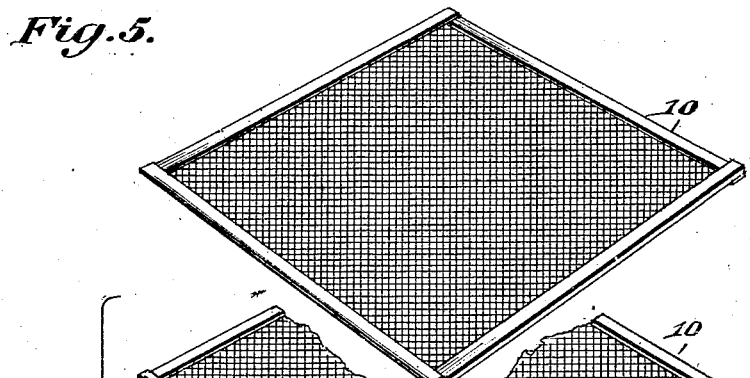
Fig. 5 is a detailed perspective view of one of the screen members.

Referring now to the drawings in detail, where like numerals of reference indicate corresponding parts throughout the several views of the drawing, 1 indicates a rectangular frame, being closed upon both sides and the rear and open in front, and having the top and bottom open as shown. Each of the sides and the rear has its upper and lower edge turned inward at right angles as at 2, the lower flange at the front of the frame being extended across as at 3, to form a brace bar across the front of the frame.

A handle member 4 is secured to the rear of the frame, by which the same may be lifted.

Secured to the inner surface of each side of the frame and spaced an equal distance from the upper and lower flange, is a guide and retaining member 5 of substantially M-shape, the central channel having apertures 6, therethrough for the passage of securing members 7. The apex of the channel 8 and each leg 9 contact with the frame member, channels having parallel walls are thus formed between the upper and lower flanges and legs.

Into the channels formed at the top and the bottom of the frame, between the flanges 2 and the legs 9, are placed from the front of the frame, screens 10, thus forming a compartment, open at its front side and screened top and bottom. This forms the main body portion of the toaster, into which the bread to be toasted is placed.

For the support of the frame above the flames a base is provided, which comprises a flat frame 11, having right angled upturned sides 12. At the corners, these sides are continued upward a slight distance forming the corner angles 13. Upon the frame 11, is placed a screen carrying frame 14, the screen 15, of which is preferably of copper and of fine mesh. Through the corners of this screen frame 14, are passed bolts 16, having nuts 17, which bolts hold the screen frame and base frame securely together, the heads of the bolts being upon the under surface of the frame and serving as feet as shown. When the main frame is placed upon the base it is supported upon the ends of the bolts 16, thus being supported a sufficient distance above the gauze screen to allow the heat to be properly distributed. The angled corners serve to keep the frame properly positioned upon the base.

When in use a slice of bread is inserted in the open side of the frame between the screens, and the frame positioned upon the base, which has been previously placed over a flame. When the slice has been sufficiently toasted it may be transferred to a plate without touching with the fingers.

Figure 6:
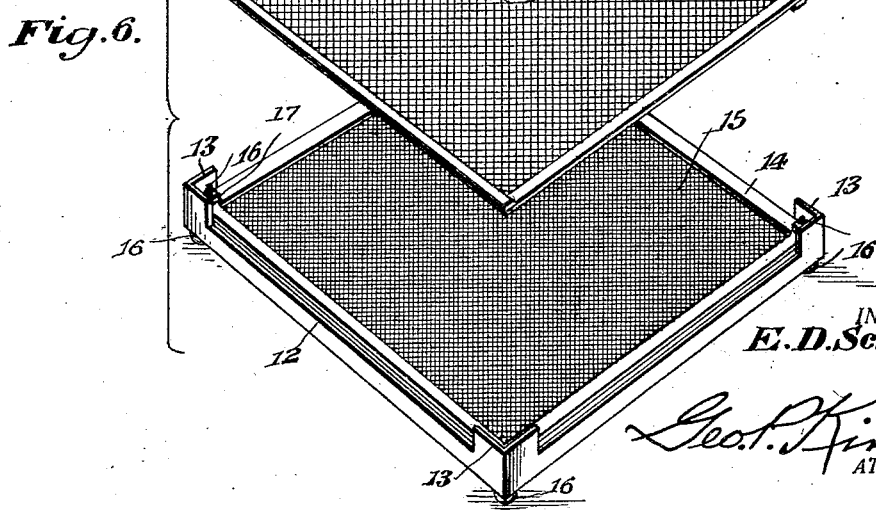
Fig. 6 is a perspective view of the base and one of the screens when they are used together as a modification of the device.

As shown in Fig. 6, the base and one of the screens may be used without the frame. In this case one screen is removed from the frame and placed upon the base and the bread laid thereupon. In this method it is necessary to turn the toast with the fingers.

Having thus described the invention, what is claimed as new is:—

1. A toaster appliance comprising, a support having a foraminous bottom and provided with vertically disposed spacing elements, a rectangular frame constituting a holder having the top, bottom and front thereof open and adapted to be mounted on said element, said frame further having an inturned flange along the top and bottom edge of the sides and back, a guide and retaining member comprising a relatively long substantially M-shaped member having the free ends of the legs and the central portion thereof resting against and extending along the inner face of each side wall and secured thereto, and a foraminous screen removably held between the flange of each side and the adjacent leg of said member to retain within the holder between the screens, an article to be toasted.

2. In a toaster appliance of the character set forth, a relatively shallow rectangular holder having the front thereof open, a removable foraminous top and bottom in said holder between which, through said open front, an article to be toasted may be inserted, a support for said holder comprising a rectangular frame having right angular upturned sides, a foraminous screen supported upon said frame within the enclosure formed by said upturned sides, and vertically disposed securing bolts extending through and securing said frame and screen together and further acting to space said holder from the screen of the frame.

3. In a toaster appliance of the character set forth, a relatively shallow rectangular holder having the front thereof open, a removable foraminous top and bottom in said holder between which, through said open front, an article to be toasted may be inserted, a support for said holder comprising a rectangular frame having right angular upturned sides, a foraminous screen supported upon said frame within the enclosure formed by said upturned sides, vertically disposed spacing elements carried by the frame to space said holder from the screen of the frame, said frame being larger than said holder, and angled uprights formed integrally with and extending from the upturned sides of said frame at the corners thereof, adapted to receive therebetween said holder to retain the same in position upon the support.

4. In a toaster appliance of the character set forth, a relatively shallow rectangular holder having the front thereof open, a removable foraminous top and bottom in said holder between which, through said open front, an article to be toasted may be inserted, a support for said holder comprising a rectangular frame having right angular upturned sides, a removable foraminous screen supported upon said frame within the enclosure formed by said upturned sides, and vertically disposed headed bolt members extending through the frame and screen and constituting spacing supporting elements for said holder, the heads of said elements being positioned upon the under side of said frame and constituting seats therefor.

In testimony whereof, I affix my signature hereto.

EDWARD D. SCHMIDT.